Figure 1:
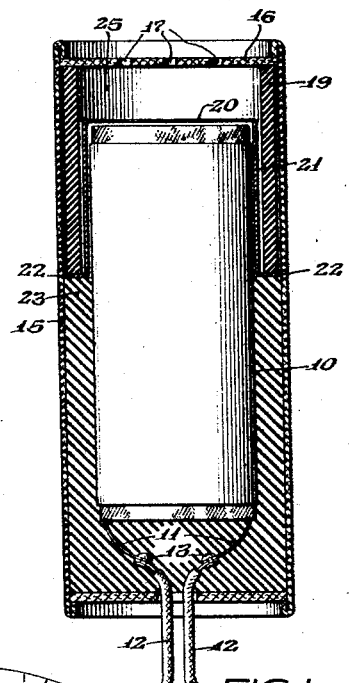

March 4, 1941.  P. McK. DEELEY  2,234,042

ELECTROLYTIC CAPACITOR

Filed Jan. 29, 1940

INVENTOR.
Paul McKnight Deeley
BY
ATTORNEY.

Patented Mar. 4, 1941

2,234,042

UNITED STATES PATENT OFFICE 2,234,042

ELECTROLYTIC CAPACITOR

Paul McKnight Deeley, Plainfield, N. J., assignor to Cornell-Dubilier Electric Corporation, South Plainfield, N. J., a corporation of Delaware Application January 29, 1940, Serial No. 316,125

7 Claims. (Cl. 175—315)

This invention relates to electrolytic capacitors and more particularly to means for relieving a capacitor from excess gas pressure developed within the capacitor unit during its operation.

Electrolytic capacitors using aluminum as electrode material in general are dependent for their current blocking action on a thin layer or film of aluminum oxide overlying the surface of at least one electrode. The aluminum oxide layer is usually deposited or formed on the surface of the electrode by an electro-chemical process by immersing the electrode as an anode in an aqueous electrolyte solution. By passing an electric current between a pair of electrodes so immersed, the water in the electrolyte is decomposed thereby causing the evolution of oxygen at the anode and hydrogen at the cathode. A portion of the oxygen evolved chemically combines with the aluminum on the anode surface, thus forming the blocking or dielectric layer. In general, the thickness of the blocking layer and consequently the operating voltage of the capacitor is dependent upon the electrostatic pressure applied to the oxygen molecule at the surface of the aluminum electrode during the forming or depositing process.

The aluminum oxide blocking layer appears to be porous or permeated with microscopic holes and during the forming process the oxygen molecule is forced deeper into these microscopic holes thus contacting more aluminum and resulting in the electro-chemical formation of a greater quantity of aluminum oxide and consequent increase of the thickness of the blocking layer. It appears, therefore, that the operation of an electrolytic capacitor is dependent for its blocking action upon a combination of a porous aluminum blocking layer and a certain quantity of oxygen gas filling the pores of this layer.

It will be apparent from the foregoing that an electrolytic capacitor with a blocking aluminum oxide layer formed and designed for operation at a given voltage will, when subjected to a higher voltage, evolve copious quantities of oxygen and hydrogen gas as a by-product of further depositing or forming a thicker and consequently higher insulating layer.

The aluminum oxide blocking layer formed is asymmetric in its current conducting characteristics; that is, it will allow a current to flow in one direction while blocking the current flow in the opposite direction. Thus, in general, if in a uni-directional or polarized capacitor having only one electrode formed with a blocking layer the polarity is reversed, the electric current flowing will evolve oygen at the non-formed electrode or cathode and hydrogen at the formed electrode or anode. Again in turn, if an electrolytic capacitor is subjected to a prolonged idle period, either the blocking layer decomposes or the oxygen gas absorbed in the dielectric film will diffuse into the electrolyte in such a manner that upon application of a potential when the capacitor is again put to use a surge current is forced through the capacitor for a certain period of time until the blocking layer has been repaired or rebuilt to its proper thickness and physical and chemical characteristics. This rebuilding or self-healing action of the oxide film is attended by the evolution of more or less copious quantities of oxygen and hydrogen gas at the respective electrodes.

The above are only a few causes of the excess gas pressure developed within a capacitor, it being obvious that other factors such as heating may contribute to the pressure increase.

In general it is common practice to protect an electrolytic capacitor from absorption of moisture or other impurities from the air which may have a destructive effect thereon by properly mounting and hermetically sealing the capacitor unit in a suitable container. The casing of an electrolytic capacitor unit so hermetically sealed is subject to rupture and in some cases with explosive violence due to the evolution of the aforementioned gases unless a suitable vent or safety arrangement is provided to allow for the escape of the excess gases from the container.

Such venting means have heretofore been both expensive or bulky and ineffective in their operation when large quantities of gases are generated within the capacitor due to accidental reversal of the current, application of an alternating current to a polarized capacitor or too rapid a reforming of the blocking layer after prolonged periods of idleness and various other causes.

Accordingly, an object of the present invention is the provision of means which are both simple in design and efficient in operation for releasing excess gas pressure developed within an electrolytic capacitor.

A further object is to provide an inexpensive pressure relieving means particularly suited for dry electrolytic capacitors.

Figure 3:
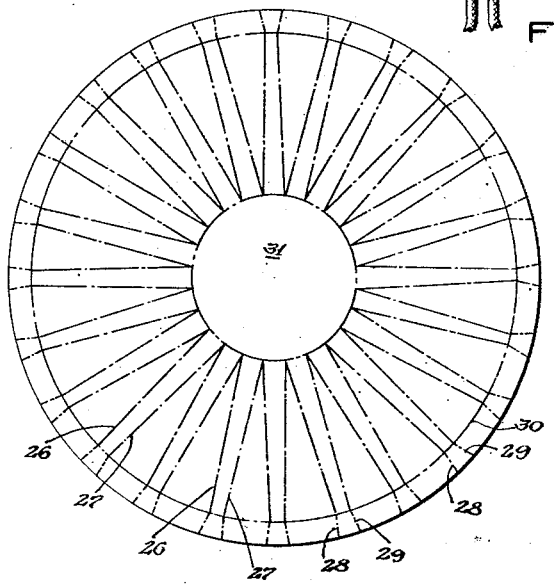
Figure 2:
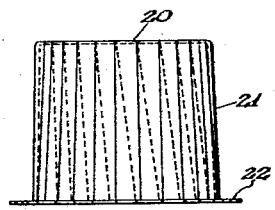

These and further objects and advantages of the invention will become more apparent from the following detailed description taken with reference to the accompanying drawing forming part of this specification and wherein:

Figure 1 is a vertical cross-sectional view of a capacitor constructed according to the invention, Figure 2 is an elevational view of one form of a cup-shaped pressure relieving member incorporated in the capacitor according to Figure 1, and Figure 3 illustrates a method of producing the member shown in Figure 2.

Referring more particularly to the drawing, wherein like reference numerals identify like parts in the different views thereof, I have shown a rolled electrolytic capacitor unit or section 10 of well known design having terminal tabs 11 extending from the electrodes within the capacitor roll and electrically secured in any suitable manner to leads or conductors 12 as by means of rivets 13. The capacitor section 10 is mounted in a container such as a protective tube 15 which may be of waxed cardboard, metal, or the like, having a top wall or closure disc 16 provided with holes or perforations 17 and secured to the tube 15 in any suitable manner. In the example shown, the tube 15 has its edge spun or rolled against the disc 16. A sleeve 19 of cardboard or other insulating material is disposed in close relation to the inner wall of the casing 15 and has its upper end resting against the inner face of the disc 16. A cup-shaped member having a top wall 20 forming a membrane and a cylindrical portion 21 provided with a flange 22 is placed over the upper end of the capacitor section 10. The top portion or membrane 20 preferably is of lesser thickness than the cylindrical portion 21 in such a manner as to be able to distend outwardly under the action of excess gas pressure developed within the capacitor. The flange 22 of the cup rests against the lower end of the sleeve 19. The remaining portion of the capacitor section 10 is embedded in wax 23 or other sealing material filling the open space of the casing 15 and hermetically sealing the capacitor unit and in particular the juncture between the sleeve 19 and the flange 22 of the cup 20—21 from the outside atmosphere. A sufficient air space 25 is provided between the closure disc 16 and the top 20 of the cup engaging the end of the condenser roll to allow for expansion of the top wall 20 prior to its rupture under the influence of internal excess gas pressure.

The cup 20—21 may consist of thin metallic foil as seen more clearly in Figure 2 and may suitably be made by a folding process from a disc as shown in Figure 3. In the latter, the side wall 21 of the cup is formed by creasing or bending the disc along lines 26 and overlapping these bends with other creases by bends 27. The flange 22 may be formed in a similar manner by bending and overlapping the peripheral portion of the disc along lines 28 and 29. It will be apparent that by suitably overlapping the creases and folds 27 over the creases and folds 26, the diameter of the circle 30 will be reduced to the diameter of the circle 31, thus resulting in a cup having a cylindrical portion 21 which is mechanically stronger than the flat portion 20 serving as a vent diaphragm or membrane as described and shown more clearly in Figure 2.

It will be further apparent that by the proper bending and folding along the lines 28, 29, an outwardly extending flange 22 will result on the cylindrical cup. The cup may advantageously be formed of very thin metallic foil such as copper, aluminum or the like of the order of one-thousandth of an inch or less in thickness or alternatively of suitably thin wax impregnated paper or the equivalent.

In operation, it will be apparent that the condenser is hermetically sealed by the wax filling 23, the cylindrical wall 21 and the thin top portion 20 of the cup member. Any gas generated within the capacitor section 10 will cause the top wall 20 of the cup to distend outwardly due to its inherent flexibility in such a manner that subsequent evolution of gas in the capacitor will result in rupture of the wall 20 or membrane at a predetermined excess pressure thereby allowing the excess gases to escape to the outside through the holes 17 in the disc 16. As will be understood, the cup need not be fabricated as disclosed in Figures 2 and 3, but may be a pressed or extruded cup having a bottom wall section of reduced thickness. Alternatively, a molded rubber cup or the equivalent may be used for the purpose of the invention. The lower end of the casing 15 may be closed in any suitable manner such as by a closure disc or cover as shown in the drawing provided with an opening for passing the leads 12, and the capacitor may otherwise be constructed and mounted in a manner well known in the art. Thus the cup 20—21 may be held in fixed position to prevent its slipping off the capacitor roll 10 by the gas pressure or any suitable manner which will be obvious to those skilled in the art.

From the foregoing it will be evident that the invention is not limited to the specific construction and arrangement of parts shown and described herein for illustration, but that numerous modifications may be resorted to in accordance with the underlying idea and broader scope of the invention as defined in the ensuing claims. The specification and drawing are to be regarded therefore in an illustrative rather than in a limiting sense.

I claim:

1. In an electrolytic capacitor, a convolute capacitor unit comprising interleaved electrode and spacer strips wound into a roll, a cup having a cylindrical portion and a flat portion forming a membrane, said cup arranged to engage one end of the capacitor unit, a casing enclosing the capacitor unit, and a sealing substance filling the space between said casing and the surface of the capacitor unit excepting said cup, said membrane being adapted to distend outwardly under the action of excess gas pressure developed within the capacitor.

2. In an electrolytic capacitor, a convolute capacitor unit comprising interleaved electrode and spacer strips wound into a roll, a cup having a relatively thicker cylindrical portion and a thin flat portion forming a membrane, said cup being arranged in firm engagement with one end of the capacitor unit, a casing enclosing the capacitor unit, and a sealing substance filling the space between said casing and the surface of the capacitor unit excepting said cup, said membrane being adapted to distend outwardly under the action of excess gas pressure developed within the capacitor.

3. In an electrolytic capacitor, a convolute capacitor unit comprising interleaved electrode and spacer strips wound into a roll, a cup having a relatively thicker cylindrical portion and a thin flat portion forming a membrane, said cup being arranged in firm engagement with one end of the capacitor unit, means for completely sealing the surface of said capacitor unit excepting said cup from the outside atmosphere, said membrane being adapted to distend outwardly under the action of excess gas pressure developed within the capacitor.

4. In an electrolytic capacitor, a convolute capacitor unit comprising interleaved electrode and spacer strips wound into a roll, a cup having a relatively thicker cylindrical portion and a thin flat portion forming a membrane, said cup being arranged in firm engagement with one end portion of the capacitor unit, a tubular casing enveloping the capacitor unit, a perforated cover secured to the end of said casing opposite to and spaced from said membrane, and a sealing substance filling the space between said casing and the surface of the capacitor unit excepting said cup, said membrane being adapted to distend outwardly under the action of excess gas pressure developed within the capacitor.

5. In an electrolytic capacitor, a convolute capacitor unit comprising interleaved electrode and spacer strips wound into a roll, a protective insulating tube enclosing the capacitor unit projecting beyond at least one end thereof, a perforated closure disc secured to the projecting end of said tube, a cup having a relatively thicker cylindrical portion formed with an outwardly extending flange and a thin flat portion forming a membrane, said cup being placed over the end of the capacitor unit opposite to said closure disc, a cylindrical member interposed in snug fitting engagement between said tube and the capacitor unit and having one end engaging said disc and having its opposite end engaging the flange of said cup, and an insulating sealing substance filling the space bounded by said tube, said cylindrical member and the capacitor unit, said membrane being adapted to distend outwardly under the action of excess gas pressure developed within the capacitor.

6. In an electrolytic capacitor, a rolled capacitor unit comprising interleaved electrode and spacer strips, a cup having a cylindrical portion and a thin flat portion forming a flexible membrane, said cup surrounding one end of said capacitor unit, a casing enclosing the capacitor unit, and means for sealing the surface of said unit not covered by said cup from the outside atmosphere, said membrane being adapted to distend outwardly under the action of excess gas pressure developed within said capacitor unit.

7. In an electrolytic capacitor, a rolled capacitor unit, a cup having a cylindrical portion and a thin flat portion forming a flexible membrane, said cup surrounding one end of said capacitor unit, a casing enclosing the capacitor unit, means for sealing the surface of said unit not covered by said cup from the outside atmosphere, said membrane being adapted to distend outwardly under the action of excess gas pressure developed within said capitor unit, and means to substantially prevent mechanical displacement of said cup excepting the distension of said membrane.

PAUL McKNIGHT DEELEY.